United States Patent
Buican et al.

(10) Patent No.: US 6,339,536 B1
(45) Date of Patent: Jan. 15, 2002

(54) I/O SHIELD BRACKET ASSEMBLY

(75) Inventors: Eugene Buican, Austin; Ty R. Schmitt, Round Rock; Robert F. Poe, Austin, all of TX (US)

(73) Assignee: Dell USA, L.P., Round Rock, TX (US)

( * ) Notice: Subject to any disclaimer, the term of this patent is extended or adjusted under 35 U.S.C. 154(b) by 0 days.

(21) Appl. No.: 09/438,558

(22) Filed: Nov. 10, 1999

(51) Int. Cl.$^7$ .................................. H05K 9/00
(52) U.S. Cl. ................... 361/818; 361/802; 361/800; 361/801; 439/607
(58) Field of Search ................ 361/818, 816, 361/753, 756, 802, 800, 801, 796, 683, 752; 174/35 R, 35 GC, 35 MS; 206/719; 439/540.1, 939, 607

(56) References Cited

U.S. PATENT DOCUMENTS

| | | | |
|---|---|---|---|
| 4,496,627 A | | 1/1985 | Azuma et al. ............... 428/336 |
| 4,764,422 A | | 8/1988 | Hill et al. ................. 428/309.9 |
| 5,191,544 A | * | 3/1993 | Benck et al. ............... 364/708 |
| 5,225,629 A | | 7/1993 | Garrett ...................... 174/35 R |
| 5,347,430 A | * | 9/1994 | Curlee et al. ............... 361/816 |
| 5,383,096 A | | 1/1995 | Benson et al. .............. 361/816 |
| 5,500,789 A | | 3/1996 | Miller et al. ................ 361/816 |
| 5,519,585 A | | 5/1996 | Jones et al. ................. 361/818 |
| 5,527,104 A | * | 6/1996 | Moss .......................... 312/264 |
| 5,564,930 A | * | 10/1996 | Yu ............................... 439/61 |
| 5,567,740 A | | 10/1996 | Free ............................ 521/128 |
| 5,584,983 A | | 12/1996 | Pruyn .......................... 205/103 |
| 5,591,482 A | | 1/1997 | He et al. ..................... 427/244 |
| 5,661,640 A | | 8/1997 | Mills et al. .................. 361/801 |
| 5,684,271 A | * | 11/1997 | Scholder et al. .......... 174/35 R |
| 5,742,003 A | * | 4/1998 | Ho ........................... 174/35 R |
| 5,770,822 A | * | 6/1998 | Abolitz et al. ......... 174/35 GC |
| 5,808,867 A | | 9/1998 | Wang .......................... 361/695 |
| 5,855,818 A | | 1/1999 | Gan et al. .................... 252/511 |
| 5,913,698 A | | 6/1999 | Keng ........................... 439/609 |
| 5,934,775 A | * | 8/1999 | Ho ............................. 312/223.2 |
| 6,023,415 A | * | 2/2000 | Mayer et al. ................ 361/816 |
| 6,053,586 A | * | 4/2000 | Cook et al. ............... 312/223.2 |
| 6,166,325 A | * | 12/2000 | Wu ........................ 174/35 GC |

OTHER PUBLICATIONS

Robert Garrett; *EMI–Shielded Computer Housing Structure And Associated Fabrication Methods Therefor*; U.S. Ser. No.: 08/199,912; Filed Feb. 22, 1994. (Copy Not Enclosed).

Russell Smith; Mark B. Pennimanm, and Todd Steigerwald; *Notebook Integrated Hybrid Cooler Design With EMI Shielding*; U.S. Ser. No.: 09/088,814; Filed Jun. 2, 1998. (Copy Not Enclosed).

Ty R. Schmitt and Andrew L. McAnally; *Combination EMI Shield And Light Channel*; U.S. Ser. No.: 09/114,690; Filed Jul. 31, 1998 (Copy Not Enclosed).

Ty R. Schmitt and Russell C. Smith; *A Computer And Method For EMI Containment In A Computer*; U.S. Ser. No.: 09/226,759; Filed Jan. 6, 1999. (Copy Not Enclosed).

(List continued on next page.)

*Primary Examiner*—Jeffrey Gaffin
*Assistant Examiner*—Hung Bui
(74) *Attorney, Agent, or Firm*—Skjerven Morrill MacPherson LLP; David G. Dolezal (57) ABSTRACT

An I/O shield bracket for an I/O window of a computer system chassis. The I/O shield bracket includes mechanisms for reducing electromagnetic radiation that emanates from the edge of the I/O shield bracket and the edge of the I/O window. In one embodiment, the I/O shield bracket includes an embossed portion that resides next to the edge of the I/O window. In another embodiment, the I/O shield bracket includes shield tabs that overlap an I/O window ledge surrounding the I/O window. An I/O gasket made of an electrically conductive material may be mounted to the I/O shield bracket to provide shielding between the I/O shield bracket and I/O connectors. The I/O shield bracket may include snap fingers for removably attaching the I/O shield bracket to a computer system chassis.

27 Claims, 7 Drawing Sheets

OTHER PUBLICATIONS

Abeye Teshome; *Method And Apparatus For Reducing EMI In A Computer System*; U.S. Ser. No.: 09/137,472; Filed Aug. 20, 1998. (Copy Not Enclosed).

Richard S. Mills And David L. Moss; *Removable TEM Shield For Daughter Card And Associated Methods Of Manufacturing*; U.S. Ser. No.: 08/584,862; Filed Jan. 5, 1996. (Copy Not Enclosed).

Damon W. Broder and Orin M. Ozias; *Printed Circuit Board Electromagnetic Energy Device*; U.S. Ser. No.: 09/419,157; Filed Oct. 15, 1999. (Copy Not Enclosed).

Leroy Jones, Jr., Steve L. Williams, and Richard N. Worley; *Serrated EMI Gasket And Computer System With Improved EMI Shielding*; U.S. Ser. No.: 09/429,201; Filed Oct. 28, 1999. (Copy Not Enclosed).

* cited by examiner

I/O SHIELD BRACKET ASSEMBLY

BACKGROUND OF THE INVENTION

1. Field of the Invention

This invention relates in general to computer systems and in particular to an I/O shield bracket for a computer system chassis.

2. Description of the Related Art

Computer systems are information handling electronic systems which can be designed to give independent computing power to one user or a plurality of users. Computer systems may be found in many forms including, for example, mainframes, minicomputers, workstations, servers, personal computers, internet terminals, notebooks, and embedded systems. Computer systems include desk top, floor standing, rack mounted, or portable versions. A typical computer system includes at least one system processor, associated memory and control logic, and peripheral devices that provide input and output for the system. Such peripheral devices may include display monitors, keyboards, mouse-type input devices, floppy and hard disk drives, CD-ROM drives, printers, network capability card circuits, terminal devices, modems, televisions, sound devices, voice recognition devices, electronic pen devices, and mass storage devices such as tape drives, CD-R drives, or DVDs.

Different computer systems have different configurations. Even the same model of computer system may be marketed with a variety of optional features. These different configurations and optional features may require different I/O connector configurations depending upon the optional features implemented. In order to minimize manufacturing costs, a computer system chassis can include a relatively large I/O window for I/O connectors to be accessible from the outside of the computer system. A removable electromagnetic (EM) radiation I/O shield bracket can be designed to provide shielding for the I/O window and include a specific pattern of holes for a particular configuration of I/O connectors. Thus, one type of computer system chassis can be utilized with different configurations of I/O connectors.

One problem with utilizing removable I/O shield brackets is that gaps may be created between the edge of the chassis and the I/O shield bracket. Such gaps are sources of EM radiation emanating from a computer system during the operation of a computer system. For example, such gaps may act as slot antennas. Also gaps may exist between the I/O connectors and the I/O shield bracket. It is desirable to limit the EM radiation due to these gaps.

SUMMARY OF THE INVENTION

It has been discovered that providing mechanisms for reducing the EM radiation emulating from the gaps between an I/O shield bracket and an I/O window of a computer system chassis advantageously reduces the EM radiation emanating from a computer system during the operation of the computer system.

In one aspect of the invention, a computer system includes a chassis. The chassis defines an I/O window for computer connectors to be accessible from outside the chassis. The computer system also includes a circuit board housed in the chassis, at least one computer connector fixably coupled to the circuit board, and an I/O shield bracket removably attached to the chassis and extending across at least a substantial portion of the I/O window. The I/O shield bracket defines at least one hole for a computer connector fixably coupled to the circuit board to be accessible from the outside of the chassis. The computer system further includes means for reducing the electromagnetic radiation radiating from between an edge of the chassis defining the I/O window and the I/O shield bracket.

In another aspect of the invention, a computer system includes a chassis. The chassis defines an I/O window for computer connectors to be accessible from outside the chassis. the computer system also includes at least one computer connector and an I/O shield bracket attached to the chassis and extending across at least a substantial portion of the I/O window. The I/O shield bracket defines at least one hole for a computer connector to be accessible from the outside of the chassis. The I/O shield bracket includes an embossed portion. The edges of the embossed portion reside next to surfaces of the chassis defining the I/O window.

In another aspect of the invention, a computer system includes a chassis. The chassis defines an I/O window for computer connectors to be accessible from outside the chassis. The computer system also includes a circuit board housed in the chassis, at least one computer connector fixably coupled to the circuit board, and an I/O shield bracket removably attached to the chassis and extending across at least a substantial portion of the I/O window. The I/O shield bracket defines at least one hole for a computer connector fixably coupled to the circuit board to be accessible from the outside of the chassis. The computer system further includes an I/O gasket of electrically conductive material mounted to the interior side of the I/O shield bracket. The I/O gasket defines at least one hole for receiving a computer connector to be accessible from the outside of the chassis. The I/O gasket provides electromagnetic shielding between the I/O shield bracket and the computer connector.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates identical items unless otherwise noted.

DETAILED DESCRIPTION

The following sets forth a detailed description of a mode for carrying out the invention. The description is intended to be illustrative of the invention and should not be taken to be limiting.

Figure 1:
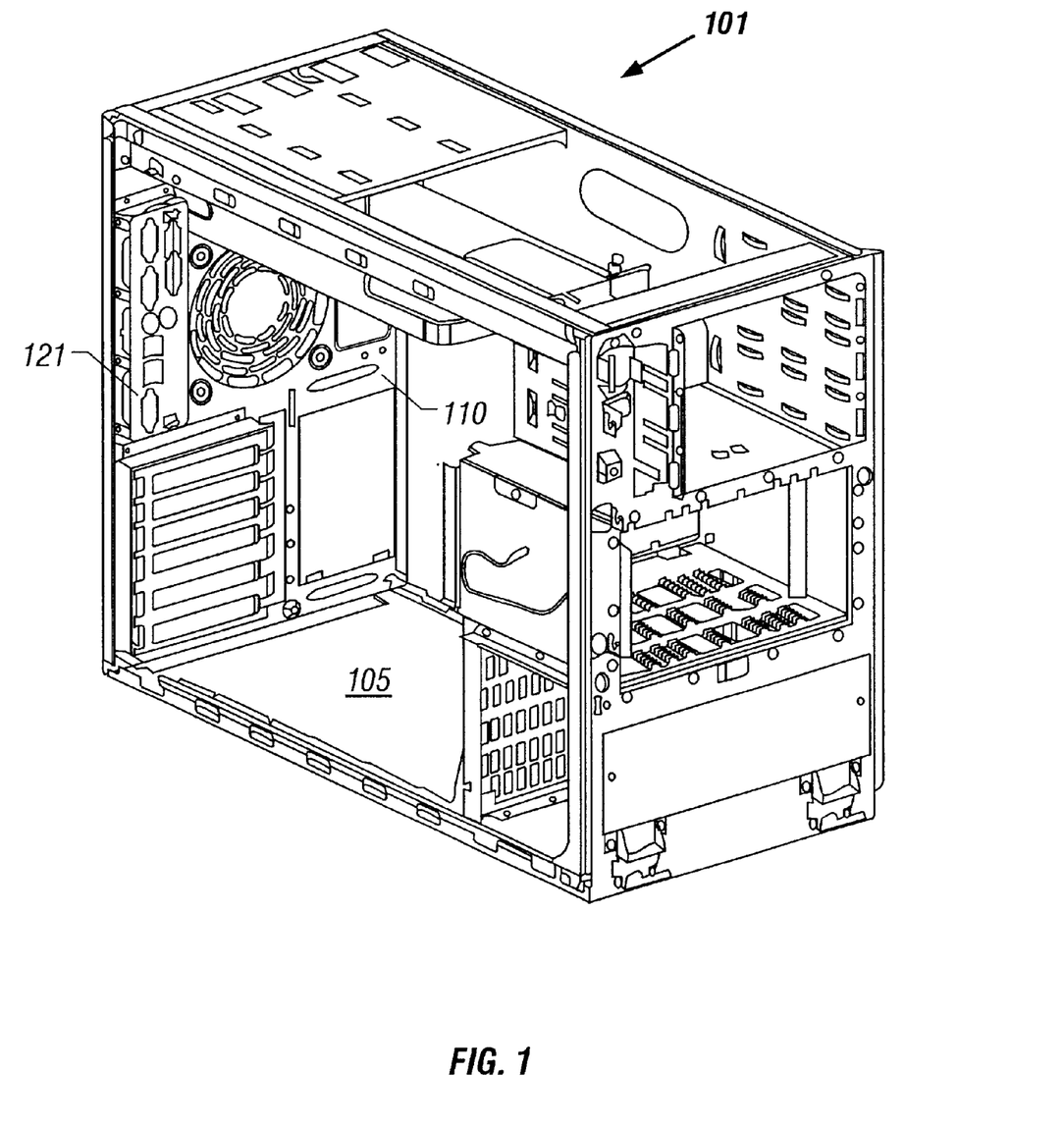
FIG. 1 is a perspective view of an example of a portion of a computer system chassis frame including an I/O shield bracket according to the present invention.

FIG. 1 is a perspective view of an example of a portion of a computer system chassis. A computer system chassis typically houses computer system components such as e.g., a system board, a system memory, a non volatile memory such as a hard disk drive, a system processor, other control logic, a power supply, and assorted adding cards (none shown in FIG. 1).

Chassis frame 101 includes a bottom panel 105 and back panel 110. Chassis frame 101 also includes various compartments for hard disk drives, power supplies, and other computer components (not shown). A computer system chassis typically includes electrically conductive side panels (e.g. side panel 1105 on FIG. 11) and a front panel (not shown) attached to chassis frame 101 to enclose the components housed in the computer system chassis and to provide electromagnietic shielding. The parts of chassis frame 101 are made of an electrically conductive material such as e.g., galvanized steel. However some portions may be made of non conductive materials such as e.g., plastic. Non conductive portions of a chassis may be coated with an electrically conductive substance for EM shielding purposes.

I/O shield bracket 121 is removably attached to chassis frame 101. I/O shield bracket 121 extends across an I/O window in back panel 110. I/O shield bracket includes a plurality holes positioned to receive I/O connectors for providing input and output to the computer system. These I/O holes typically have a shape and size that is slightly larger than the cross section of the electrical connectors that extend through them. Examples of computer connectors that may be received by the holes in an I/O shield bracket include serial RS 232 connectors, universal serial bus connectors, SCSI connectors, serial connectors, parallel connectors, and network interface connectors. I/O shield bracket 121 is made of an electrically conductive material such as e.g., galvanized steel to provide electromagnetic shielding.

Figure 2:
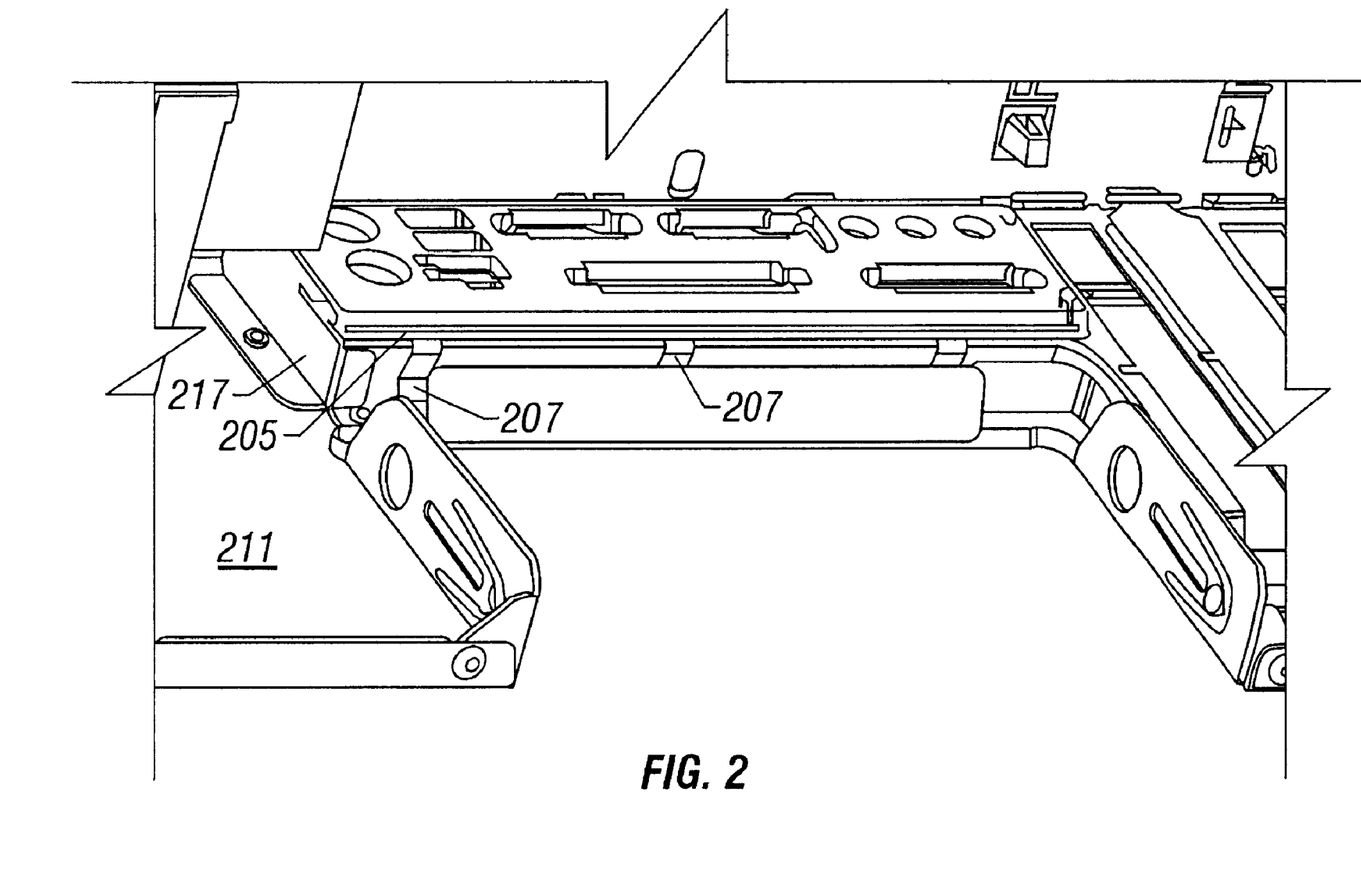
FIG. 2 is a top down partial view of an example of an I/O shield bracket removably attached to a computer system chassis according to the present invention.

FIG. 2 is a top view showing an I/O shield bracket 205 removably attached to a computer system chassis. I/O shield bracket 205 includes snap fingers 207 for engaging portions of window ledge 217. Providing an I/O shield bracket with snap fingers advantageously allows the I/O shield bracket to be removably attached to a chassis without the use of separate attachment mechanisms such as screws or rivets. However, other computer systems may utilize such attachment mechanisms for attaching an I/O shield bracket to a chassis.

Window ledge 217 extends inwards towards the interior of the chassis and is riveted to back panel 211. One advantage of providing a computer system chassis with a window ledge for an I/O opening is that it provides physical protection for the mated I/O connectors.

Figure 3:
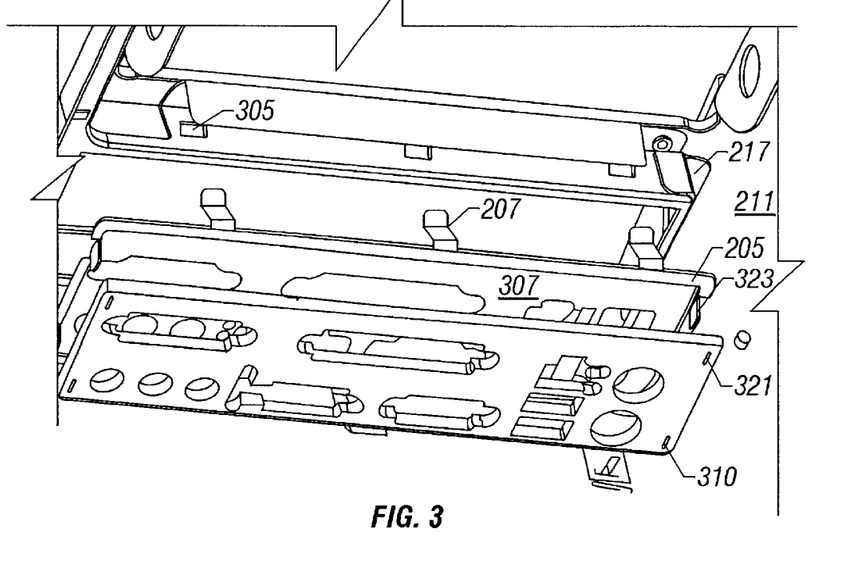
FIG. 3 is a partial perspective view of an example of an I/O window of a computer system chassis showing the alignment of an I/O shield bracket and I/O gasket according to the present invention.

FIG. 3 is a partial perspective view of an I/O window of a computer system chassis showing the alignment of an I/O shield bracket and an I/O gasket according to the present invention. In FIG. 3, I/O shield bracket 205 is shown in an aligned but detached position with respect to window ledge 217. Window ledge 217 surrounds the I/O window and includes attachment holes 305 that portions of snap fingers 207 reside in when I/O shield bracket 205 is removable attached to window ledge 217.

Also shown in FIG. 3 is an I/O gasket 310. I/O gasket 310 is made of an electrically conductive foam and includes a plurality of holes for I/O connectors that generally match the holes of I/O shield bracket 205. I/O gasket 310 also includes slits 321 for receiving mounting tabs 323 of I/O shield bracket 205 to mount I/O gasket 310 to the interior side of I/O shield bracket 205. In one embodiment, the I/O gasket is made of an electrically conductive foam material such as a nickel woven mesh sold by CHOMERICS.

I/O gasket 310 is positioned to electrically contact the interior side of I/O shield bracket 205 and to electrically contact I/O connectors (not shown) extending through the holes of I/O gasket 310 to reduce the amount of electromagnetic radiation emanating from the holes in I/O shield bracket 205. (See FIG. 6). In one embodiment, I/O gasket 310 is formed from a layer of conductive foam and is cut to provide the shape and hole pattern shown in FIG. 3.

Figure 4:
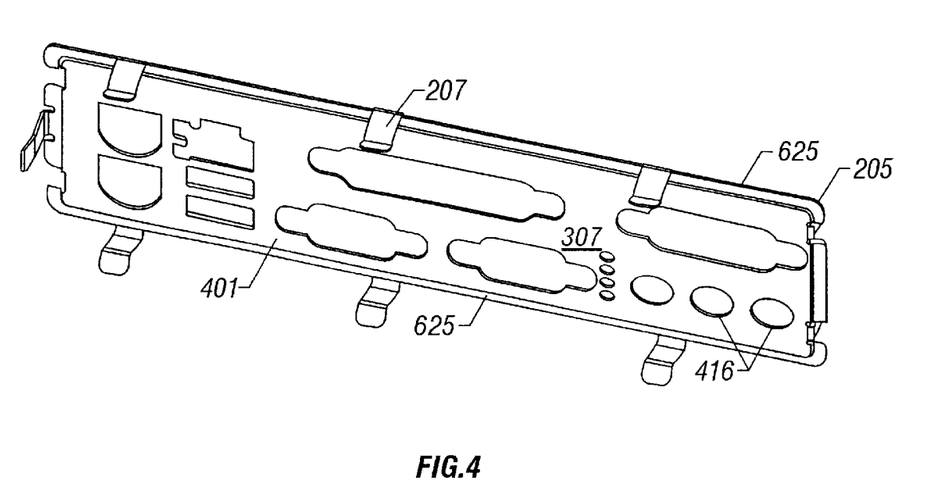
FIG. 4 is a perspective view of an example of an I/O shield bracket according to the present invention.

FIG. 4 is a perspective view of I/O shield bracket 205 showing the exterior side 401 of bracket 205.

Figure 5:
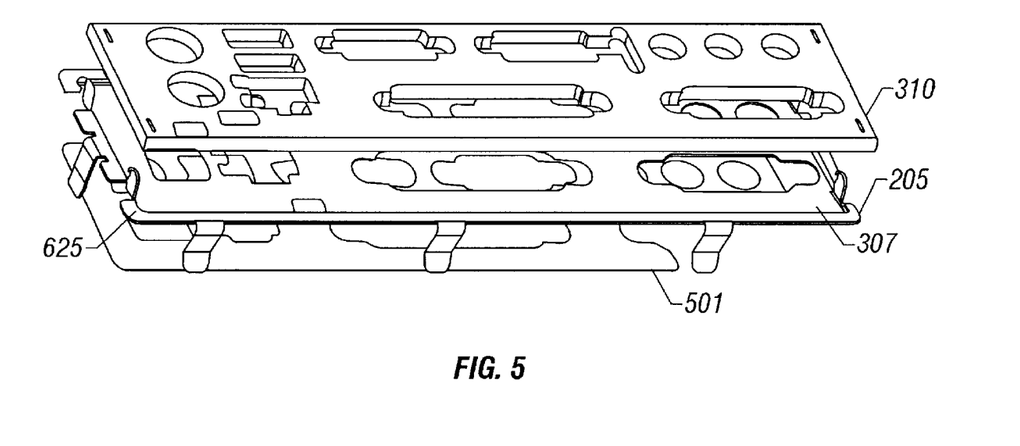
FIG. 5 is a perspective view showing the alignment of an example of an I/O shield bracket, an I/O gasket, and an I/O face-plate according to the present invention.

FIG. 5 is a perspective view showing the alignment of an example of an I/O shield bracket, an I/O gasket, and an I/O face-plate according to the present invention. Some computer systems may include an I/O face-plate 501 attached to the exterior side 401 of I/O shield bracket 205. An I/O face-plate can be used for cosmetic appearances and/or for providing an identification of each I/O connector accessible from each hole in the I/O shield bracket. An I/O face plate may also be used to cover additional I/O holes in the I/O shield bracket for I/O connectors that are not being used. An I/O face plate can be made of a non conductive or conductive material. however, if the I/O face plate is used for shielding, the plate is preferably made of a conductive material or coated with a conductive material.

Figure 6:
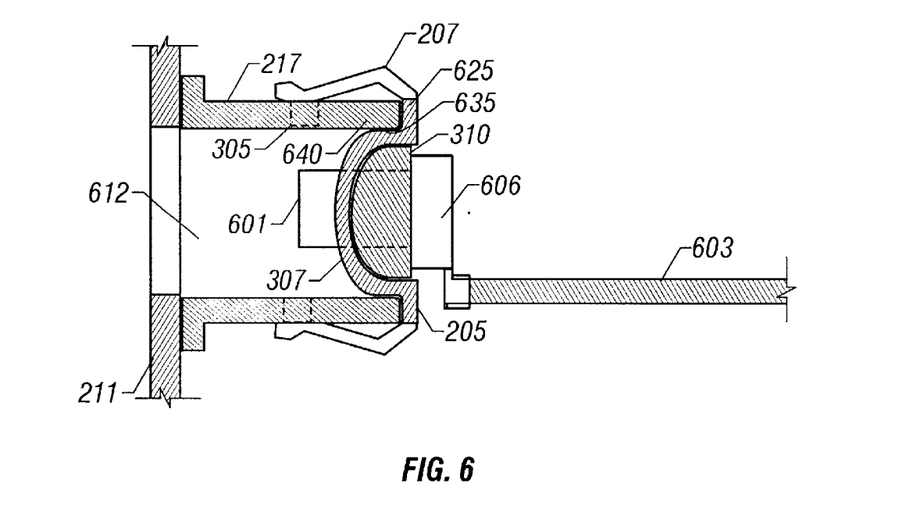
FIG. 6 is a partial side cutaway view of an example of an I/O shield bracket removably attached to a computer system chassis according to the present invention.

FIG. 6 is a partial side cutaway view of an example of an I/O shield bracket removably attached to a computer system chassis according to the present invention. Circuit board 603 is mounted in the computer system chassis. An I/O connector 601 is fixably attached to circuit board 603 and is electrically coupled to signal traces (not shown) located on or embedded in circuit board 603. I/O connector 601 extends through a hole in gasket 310 and a hole in I/O shield bracket 205 to be accessible from the exterior of the computer system chassis. Connector 601 includes a base portion 606 that resides parallel to the I/O window 612. I/O gasket 310 is pressed against base 606 and the interior side of I/O shield bracket 205 to provide an electrically conductive path between base 606 and I/O shield bracket 205 that surrounds the portion of connector 601 that extends through the I/O holes in I/O shield bracket 205.

I/O shield bracket 205 (as shown in FIGS. 2–6) includes an embossed portion 307 that is shown in FIG. 6 extending into the I/O window out towards the exterior of the computer system chassis. The edge 635 of embossed portion 307 resides next to the inner sides of the edge 640 of window ledge 217. The I/O hole that connector 601 extends through is located within embossed portion 307. Referring back to FIGS. 4 and 5, FIG. 4 shows the exterior side of embossed portion 307 and FIG. 5 shows the interior side of embossed portion 307.

Referring back to FIG. 6, embossed portion 307 acts to limit the radiation that emanates from between I/O shield bracket 205 and the edge of I/O window 612. In FIG. 6, the lip 625 of I/O bracket 205 and edge 635 of embossed portion 307 provide an interface with the edge 640 of window ledge 217 that includes an approximate 90 degree bend. Preferably, edge 635 of embossed portion 307 is positioned such that it contacts the inner side of window ledge 217 and yet allows for lip 625 to reside against the interior side of edge 640.

Referring back to FIG. 4, one method of making I/O shield bracket 205 includes cutting a pattern from a sheet of galvanized steel or other conductive material (not shown). The pattern includes projections for snap fingers 207 and holes for I/O holes 416. The cut sheet is then pressed to form embossed portion 307. Afterwards, the snap fingers are bent to their positions shown in FIG. 4.

Other I/O shield brackets according to the present invention include ridges located adjacent to the lip of the I/O shield bracket that, when installed in the I/O window, reside next to the edge of the window ledge. Such embodiments would include a continuous ridge around the perimeter of the bracket or the ridge would be broken at various locations. However, gap distances between the discontinuities in the ridges are preferably minimized so as to minimize the slot antennae effect.

Figure 7:
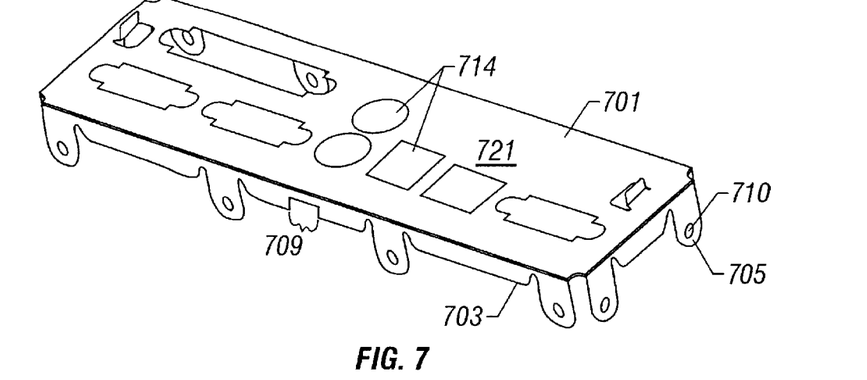
FIG. 7 is a perspective view of an example of an I/O shield bracket according to the present invention.
Figure 8:
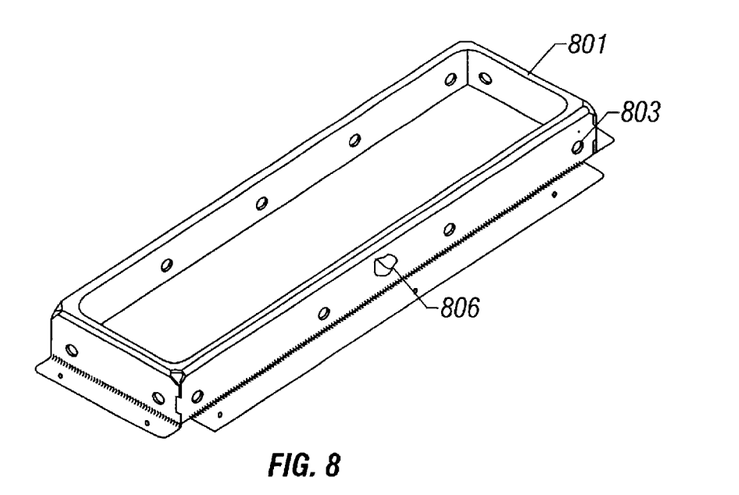
FIG. 8 is a perspective view of an example of an window ledge according to the present invention.
Figure 9:
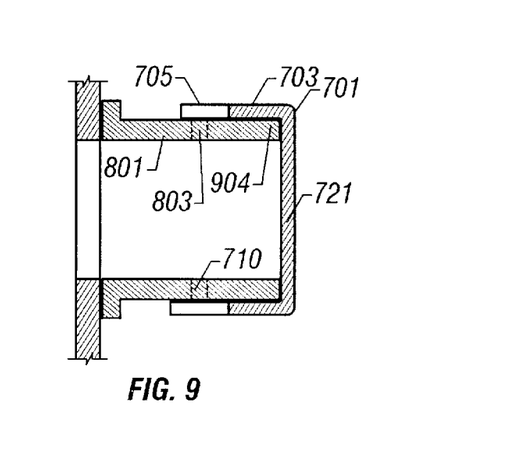
FIG. 9 is a side cutaway view of an example of an I/O shield bracket removably attached to a computer system chassis according to the present invention.

FIGS. 7–9 illustrate another embodiment of an I/O shield bracket according to the present invention. Referring to FIG. 7, I/O shield bracket 701 includes shielding tabs 703 that overlap a window ledge 801 when I/O shield bracket 701 is removably attached to window ledge 801 (See FIG. 8). I/O shield bracket 701 also includes snap fingers 705 each of which includes a detent 710 that resides in a circular detachment hole 803 of window ledge 801 when I/O shield bracket 701 is removable attached to window ledge 801 (See FIG. 9). I/O shield bracket 701 includes a plate 721 having I/O holes 714 for I/O connectors (not shown).

Referring to FIG. 8, window ledge 801 includes an alignment tab 806 that when I/O shield bracket 701 is removably attached to window ledge 801 resides in notch 709. The shielding tab (not shown) on the opposite side of I/O shield bracket 701 does not include a corresponding notch. Thus, alignment tab 806 prevents I/O shield bracket 701 from being installed up side down with respect to the computer system chassis.

FIG. 9 shows a partial side cutaway view of I/O shield bracket 701 removably attached to window ledge 801 of a computer system chassis. Not shown in FIG. 9 are the I/O connectors that are accessible via I/O holes 714 in I/O shield bracket 701.

The shield tabs 703 act to limit the radiation that emanates from between I/O shield bracket 205 and the edge of the I/O window. In FIG. 9, plate 721 and shield tabs 703 provide an interface with the edge 904 of window ledge 801 that includes an approximate 90 degree bend.

Figure 10:
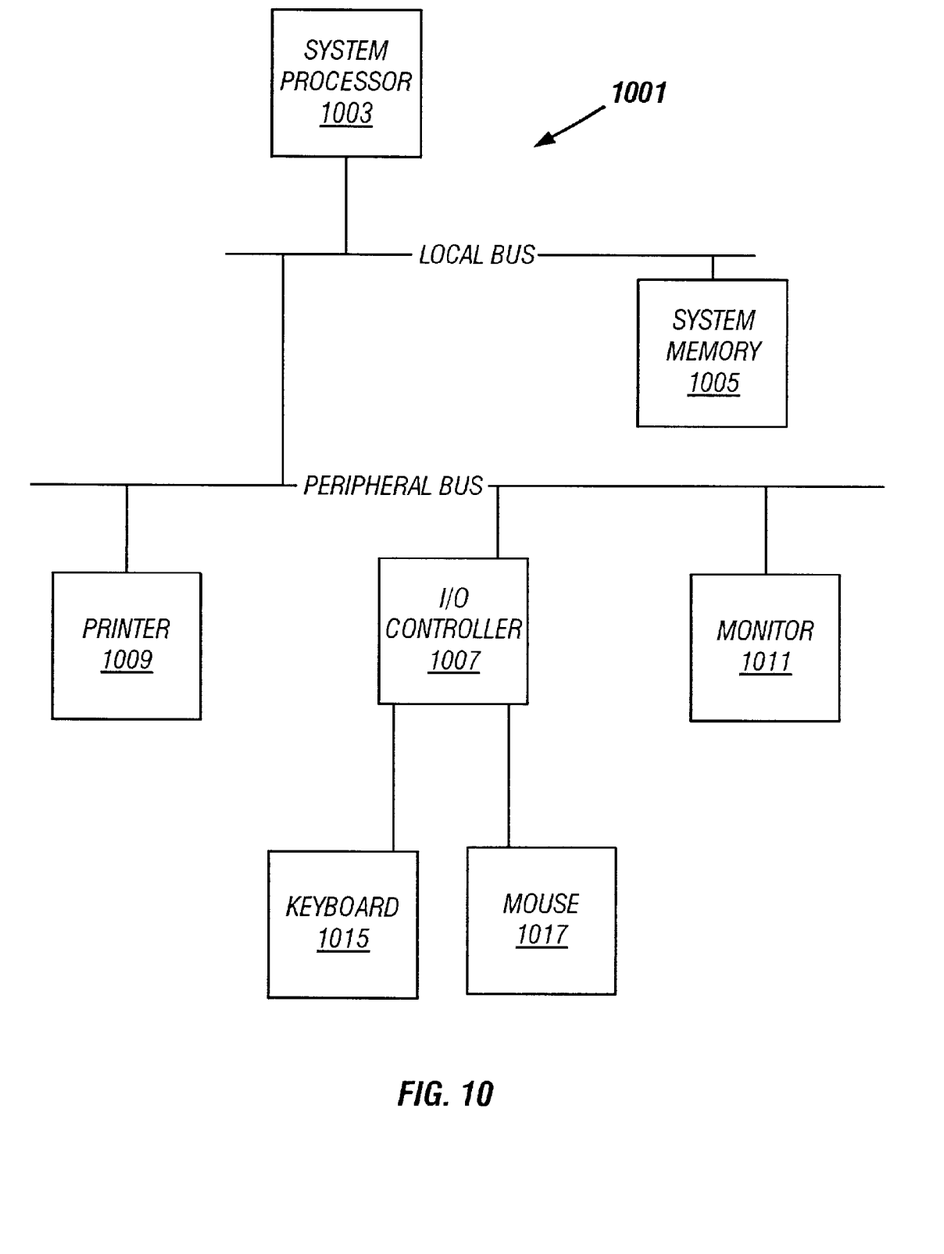
FIG. 10 is a block diagram view of an example of a computer system according to the present invention.

FIG. 10 is a block diagram of a computer system according to the present invention. Computer system 1001 includes a system processor 1003 and a system memory 1005 operably coupled to system processor 1003 via a Local Bus. Computer system 1001 also includes a number of peripheral devices that are operably coupled to a Peripheral Bus. Such devices include a printer 1009, an I/O controller 1007, and a monitor 1011. Operably coupled to I/O controller 1007 are keyboard 1015 and mouse 1017. It is understood that a computer system according to the present invention may include other peripheral devices and may have other configurations. Some examples of computer systems include the POWEREDGE 2400 and the DELL DIMENSION L SERIES sold by the DELL COMPUTER CORP.(TM).

Printer 1009, monitor 1011, keyboard 1015, and mouse 1017 may all be coupled to computer system 1001 via cables that are mated with I/O connectors accessible via I/O holes in an I/O shield bracket (e.g., brackets 205 and 701).

Figure 11:
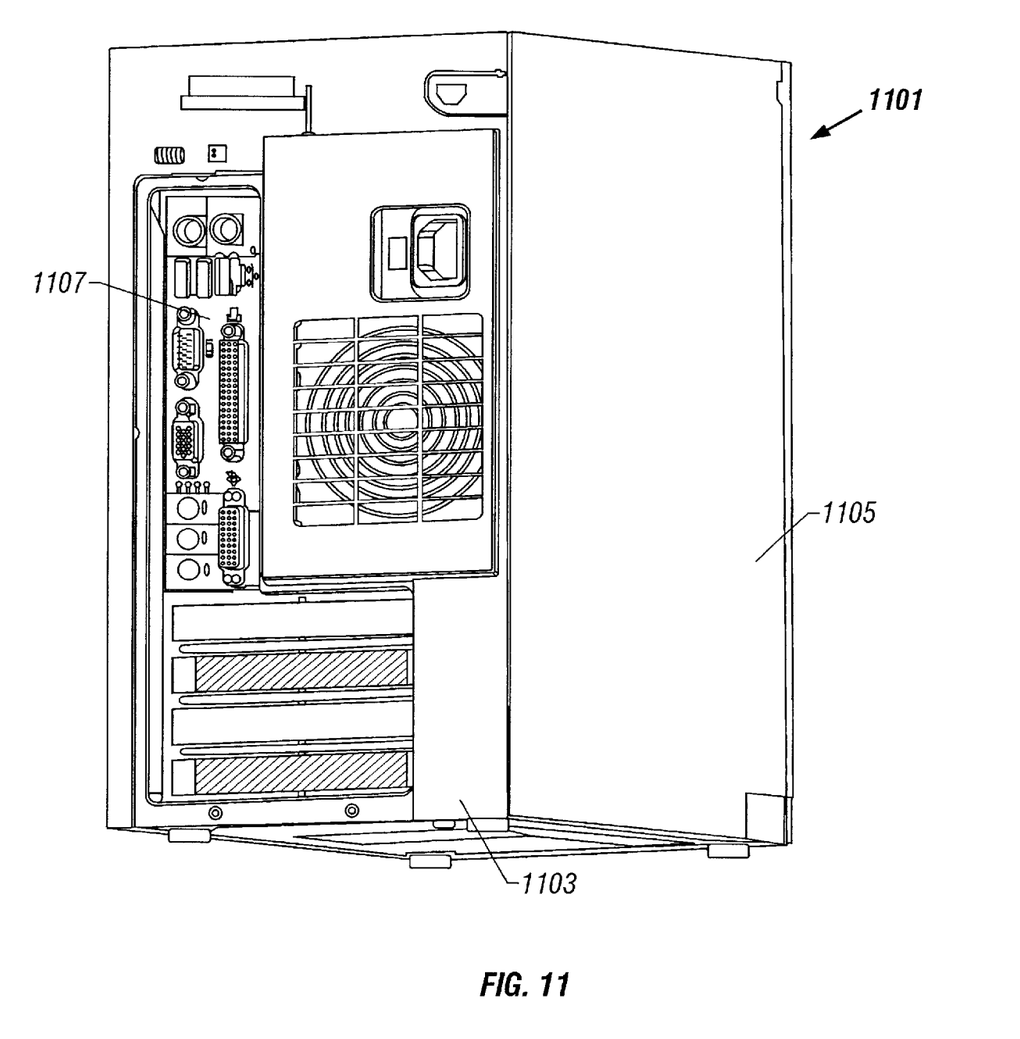
FIG. 11 is a perspective view of an example of a computer system chassis including an I/O shield bracket according to the present invention.

FIG. 11 is a perspective view of an example of a computer system chassis including an I/O shield bracket according to the present invention. Computer chassis 1101 includes a back panel 1103, a side panel 1105, and an I/O shield bracket 1107.

Those of skill in the art will recognize that, based upon the teachings herein, several modifications may be made to the embodiments shown in FIGS. 1–11 and described herein. For example, an I/O shield bracket may be made from a non conductive material and coated with a conductive substance to provide EM shielding. Also, an I/O shield bracket may be made of separately formed parts and that are later attached together. In addition, an I/O shield bracket may be removably attached to other chassis parts such as an outer chassis panel.

While particular embodiments of the present invention have been shown and described, it will be recognized to those skilled in the art that, based upon the teachings herein, further changes and modifications may be made without departing from this invention and its broader aspects, and thus, the appended claims are to encompass within their scope all such changes and modifications as are within the true spirit and scope of this invention.

What is claimed is:

1. A computer system comprising:
   a chassis, the chassis defining an I/O window for computer connectors to be accessible from outside the chassis;
   a circuit board housed in the chassis;
   at least one computer connector fixably coupled to the circuit board;
   an I/O shield bracket removably attached to the chassis and extending across at least a substantial portion of the I/O window, the I/O shield bracket defining at least one hole for a computer connector fixably coupled to the circuit board to be accessible from the outside of the chassis;
   means for reducing the electromagnetic radiation radiating from between an edge of the chassis defining the I/O window and the I/O shield bracket, and wherein the means includes an embossed portion of the I/O shield bracket, edges of the embossed portion residing next to surfaces of the chassis defining the I/O window.

2. The computer system of claim 1 wherein in the means for reducing further includes means for providing a interface between the edge of the chassis and the I/O shield bracket that includes an approximate 90 degree bend.

3. The computer system of claim 1 wherein:
   the chassis further includes a window ledge extending towards the interior of the chassis, the window ledge defining the I/O window;
   wherein the means includes shielding tabs extending from edges of the I/O shield bracket and overlapping portions of the window ledge.

4. The computer system of claim 3 wherein the window ledge is separately formed and attached to a chassis panel.

5. The computer system of claim 3 further comprising:
   a plurality of snap fingers extending from edges of the I/O shield bracket at locations between the shielding tabs, the snap fingers engaging portions of the chassis to attach the I/O shield bracket to the chassis.

6. The computer system of claim 1 further comprising:

an I/O gasket of electrically conductive material mounted to the interior side of the I/O shield bracket, the I/O gasket defining at least one hole for a computer connector to be accessible from outside of the chassis;

wherein the I/O gasket provides electromagnetic shielding between the I/O shield bracket and the computer connector.

7. The computer system of claim 1 further comprising:

means for preventing the attachment of the I/O shield bracket in an improper orientation with respect to the chassis.

8. The computer system of claim 1 further comprising:

at least one snap finger extending from the I/O shield bracket and engaging a portion of the chassis to attach the I/O shield bracket to the chassis.

9. The computer system of claim 8 wherein each of the at least one snap finger includes a portion that resides in a hole defined in the chassis.

10. A computer system comprising:

a chassis, the chassis defining an I/O window for computer connectors to be accessible from outside the chassis;

at least one computer connector;

an I/O shield bracket attached to the chassis and extending across at least a substantial portion of the I/O window, the I/O shield bracket defining at least one hole for a computer connector to be accessible from the outside of the chassis, the I/O shield bracket including an embossed portion, edges of the embossed portion residing next to surfaces of the chassis defining the I/O window.

11. The computer system of claim 10 wherein the embossed portion extends outward from the interior of the computer system.

12. The computer system of claim 10 further comprising:

means for preventing the attachment of the I/O shield bracket in an improper orientation with respect to the chassis.

13. The computer system of claim 10 further comprising:

at least one snap finger extending from an edge of the I/O shield bracket and engaging a portion of the chassis to attach the I/O shield bracket to the chassis.

14. The computer system of claim 13 wherein:

the chassis further includes a window ledge extending towards the interior of the chassis, the window ledge defining the I/O window;

the at least one snap finger engaging a portion of the outer side of the window ledge.

15. The computer system of claim 10 wherein:

the chassis further includes a window ledge extending towards the interior of the chassis, the window ledge defining the I/O window;

the embossed portion extending into the window ledge from the interior of the chassis.

16. The computer system of claim 10 further comprising:

an I/O gasket of electrically conductive material mounted to an interior side of the I/O shield bracket, the I/O gasket defining at least one hole for a computer connector to be accessible from the outside of the chassis;

wherein the I/O gasket provides electromagnetic shielding between the I/O shield bracket and the computer connector.

17. The computer system of claim 10 wherein:

the chassis further includes a window ledge extending towards the interior of the chassis, the window ledge defining the I/O window;

edges of the embossed portion resides next to interior surfaces of the window ledge.

18. The computer system of claim 10 wherein:

the at least one hole is defined in the embossed portion.

19. The computer system of claim 10 wherein the I/O shield bracket is removably attached to the chassis.

20. A computer system comprising:

a chassis, the chassis defining an I/O window for computer connectors to be accessible from outside the chassis;

a circuit board housed in the chassis;

at least one computer connector fixably coupled to the circuit board;

an I/O shield bracket removably attached to the chassis and extending across at least a substantial portion of the I/O window, the I/O shield bracket defining at least one hole for a computer connector fixably coupled to the circuit board to be accessible from the outside of the chassis;

an I/O gasket of electrically conductive material mounted to the interior side of the I/O shield bracket, the I/O gasket defining at least one hole for receiving a computer connector to be accessible from the outside of the chassis;

wherein the I/O gasket provides electromagnetic shielding between the I/O shield bracket and the computer connector.

21. The computer system of claim 20 further comprising:

means for reducing the electromagnetic radiation radiating from between an edge of the chassis defining the I/O window and the I/O shield bracket.

22. The computer system of claim 20 wherein:

a connector of the at least one connector includes a base portion residing generally parallel to the I/O window, the I/O gasket is in electrical contact with the base portion.

23. The computer system of claim 20 wherein the electrically conductive gasket is made of an electrically conductive foam material.

24. The computer system of claim 20 wherein:

the I/O shield bracket further includes at least two tabs extending towards the interior of the computer system in a generally perpendicular direction to an interior side of the bracket, each tab residing within a mounting slit defined by the I/O gasket to mount the I/O gasket to the I/O shield.

25. The computer system of claim 1 wherein the at least one hole is defined in the embossed portion.

26. The computer system of claim 1 wherein the embossed portion of the I/O shield bracket defines a plurality of holes for computer connectors to be accessible from the outside of the chassis.

27. The computer system of claim 10 wherein the embossed portion of the I/O shield bracket defines a plurality of holes for computer connectors to be accessible from the outside of the chassis.

* * * * *